United States Patent
Partridge et al.

(10) Patent No.: US 8,539,464 B2
(45) Date of Patent: Sep. 17, 2013

(54) DISTRIBUTED JUST-IN-TIME COMPILATION

(75) Inventors: Ian O Partridge, Hampshire (GB);
Adam J Pilkington, Hampshire (GB);
David S Renshaw, Hampshire (GB);
Simon Charles Edward Rowland, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 1357 days.

(21) Appl. No.: 12/261,653

(22) Filed: Oct. 30, 2008

(65) Prior Publication Data

US 2010/0115501 A1    May 6, 2010

(51) Int. Cl.
  *G06F 9/45* (2006.01)
  *G06F 15/16* (2006.01)
(52) U.S. Cl.
  USPC ............ 717/148; 717/153; 717/154; 709/203
(58) Field of Classification Search
  None
  See application file for complete search history.

(56) References Cited

U.S. PATENT DOCUMENTS

| | | | | |
|---|---|---|---|---|
| 5,778,231 A | * | 7/1998 | van Hoff et al. | 717/143 |
| 6,370,687 B1 | * | 4/2002 | Shimura | 717/146 |
| 7,213,240 B2 | * | 5/2007 | Wong et al | 717/148 |
| 7,320,121 B2 | | 1/2008 | Krueger | |
| 7,562,353 B2 | * | 7/2009 | Bedner et al. | 717/140 |
| 7,587,712 B2 | * | 9/2009 | Mountain et al. | 717/148 |
| 7,707,563 B2 | * | 4/2010 | Wei | 717/140 |
| 8,397,225 B2 | * | 3/2013 | Barsness et al. | 717/151 |
| 2004/0003380 A1 | * | 1/2004 | Fedorov | 717/148 |
| 2004/0015911 A1 | * | 1/2004 | Hinsley et al. | 717/147 |
| 2004/0015914 A1 | * | 1/2004 | Renouf | 717/148 |
| 2007/0294679 A1 | * | 12/2007 | Bobrovsky et al. | 717/146 |
| 2008/0115119 A1 | * | 5/2008 | Lagergren | 717/148 |
| 2008/0263529 A1 | * | 10/2008 | Beretta | 717/146 |
| 2009/0055810 A1 | * | 2/2009 | Kondur | 717/140 |
| 2009/0113402 A1 | * | 4/2009 | Chen et al. | 717/140 |
| 2009/0144711 A1 | * | 6/2009 | Chang | 717/151 |
| 2009/0271775 A1 | * | 10/2009 | Barsness et al. | 717/151 |
| 2013/0091496 A1 | * | 4/2013 | Barsness et al. | 717/148 |

OTHER PUBLICATIONS

Lee et al., Design, Implementation, and Evaluation of a Compilation Server, published by ACM Aug. 2007, pp. 1-40.*
Han B. Lee, Improving Performance of Mobile Programs via a Compilation Service, published 2004, pp. 1-157.*

(Continued)

*Primary Examiner* — Tuan Q Dam
*Assistant Examiner* — Zheng Wei
(74) *Attorney, Agent, or Firm* — Cantor Colburn LLP; Rahan Uddin (57) ABSTRACT

A method of performing distributed just-in-time compilation includes sending a first request message from a client platform to a dedicated compilation server requesting just-in-time compilation of a bytecode sequence generated from a set of code for a source program executing on the client platform; compiling the bytecode sequence at the compilation server into a set of machine code instructions executable by the client platform; storing the set of machine code instructions in a repository managed by the dedicated compilation server; sending a notification message indicating that the set of machine code instructions are available from the dedicated compilation server to the client platform; sending a second request message from the client platform to the dedicated compilation server requesting the set of machine code instructions; and accessing the repository to send the set of machine code instructions from the dedicated compilation server to the client platform.

4 Claims, 4 Drawing Sheets

(56) References Cited

OTHER PUBLICATIONS

Probst et al., Computing in the Network, published 2004, pp. 1-7.*

Newsome et al., Proxy Compilation of Dynamically Loaded Java Classes with MoJo, published 2002, pp. 204-212.*

Zhu et al., JIT-Compiler-Assisted Distributed Java Virtual Machine, published by University of Hong Kong, 2004, pp. 1-9.*

Li et al., Proxy Compilation, Even Better Tahn Ever?, published by PGNet 2006, pp. 1-5.*

* cited by examiner

DISTRIBUTED JUST-IN-TIME COMPILATION

BACKGROUND

Exemplary embodiments of the present invention relate to compilation of software programs from code written in a source language to code written in a language executable by a target machine, and more particularly, to just-in-time compilation of software programs.

Java, which is used for a wide range of applications including games, pervasive devices, and critical e-business applications, is one of the most dominant programming languages. Because Java is an interpreted language, any programs written in Java, after being converted into Java class files containing Java bytecode (an architecture-neutral distribution format), are interpreted by a Java virtual machine (JVM) for each platform. In order to improve performance, many JVMs may compile Java classes into platform-specific binary code after they are loaded into the JVM. Then, instead of being interpreted, Java classes are executed in their compiled native code format, similar to programs written in other languages such as C, C++, etc, by converting the given bytecode sequences "on-the-fly" at runtime into an equivalent sequence of the native code for the underlying machine. Such just-in-time (JIT) compilation of Java programs can significantly improve the speed of execution of Java programs.

Nevertheless, the compilation time overhead of a JIT compiler, in contrast to that of a conventional static compiler, is included in the Java program execution time. Thus, for a given Java class method, JIT compilation can be justified only if the compiled method code executes in less time than the interpreted byte code for the method. Otherwise, the method should be executed by interpreting the method's bytecodes. For typical Java applications, there are many class methods that are only rarely invoked, making JIT compilation of such methods unjustified.

In advanced JVM implementations, JIT compilers compile Java methods selectively, depending upon the satisfaction of certain criteria. This so-called "hot-spot compiling" is a hybrid of interpretation and just-in-time compilation that attempts to combine both techniques in order to yield Java programs that run as fast as natively compiled code. An interpreter called a "mixed mode interpreter" may perform this type of execution in the execution engine. A mixed-mode interpreter attempts to analyze or profile the program in order to determine the locations of the program that justify the time expense for compiling a portion of the program.

The usual approach to optimization is to profile the program in a temporal dimension to discover exactly where the program spends most of its time, and then spend time optimizing portions of the program that execute most often. In this approach, the JVM begins the execution of the program by interpreting the program. As the JVM interprets the program's bytecodes, it analyzes the execution of the program to determine the program's "hot spots," which is the part of the program where the program spends most of its time. When it identifies a hot spot, the JVM directs JIT compilation of only the portion of the code that encompasses the hot spot. The optimizations performed during JIT compilation, however, can be especially time intensive, and a moderate-sized Java program may execute millions of different bytecode sequences in which there are many bytecode sequences to optimize. Designers of JIT compilers must therefore trade off the time spent optimizing a bytecode sequence against the runtime gain from making that sequence faster.

SUMMARY

An exemplary embodiment of a method of performing distributed just-in-time compilation includes sending a first request message from a client platform to a dedicated compilation server via a network requesting just-in-time compilation of a first bytecode sequence generated from a set of code for a source program executing on the client platform; compiling the first bytecode sequence at the dedicated compilation server into a first set of machine code instructions executable by the client platform; storing the first set of machine code instructions in a repository managed by the dedicated compilation server; sending a first notification message indicating that the first set of machine code instructions are available from the dedicated compilation server to the client platform via the network; sending a second request message from the client platform to the dedicated compilation server via the network requesting the first set of machine code instructions; and accessing the repository to send the first set of machine code instructions from the dedicated compilation server to the client platform. The first request message includes the first bytecode sequence and a first set of information describing the client platform.

Exemplary embodiments of the present invention that are related to computer program products and data processing systems corresponding to the above-summarized method are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other objects, features, and advantages of the various embodiments of the present invention are apparent from the following detailed description of exemplary embodiments taken in conjunction with the accompanying drawings in which:

The detailed description explains exemplary embodiments of the present invention, together with advantages and features, by way of example with reference to the drawings. The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

DETAILED DESCRIPTION

While the specification concludes with claims defining the features of the invention that are regarded as novel, exemplary will be better understood from a consideration of the detailed description in conjunction with the drawings. It is of course to be understood that the embodiments described herein are merely exemplary, which can be embodied in various forms. Therefore, specific structural and functional details disclosed in relation to the exemplary embodiments described herein are not to be interpreted as limiting, but merely as a representative basis for teaching one skilled in the art to variously employ embodiments in virtually any appropriate form, as well as any suitable modifications that may be made to these embodiments. Further, the terms and phrases used herein are not intended to be limiting but rather to provide an understandable description of the invention. As used herein, the singular forms "a", an and "the" are intended to include the plural forms as well, unless the content clearly indicates otherwise. It will be further understood that the terms "comprises", "includes", and "comprising", when used in this specification, specify the presence of stated features, integers, steps, operations, elements, components, and/or groups thereof.

Exemplary embodiments of the present invention can be implemented to provide a mechanism for performing "just-in-time" (JIT) compilation remotely from the execution environment for a software program in a distributed computing system. That is, exemplary embodiments can be implemented so that when an interpreter in the local execution environment for the software application determines an invoked bytecode should be compiled by a JIT compiler, the invoked bytecode is sent to a JIT compiler operating on a remote system for compilation, and the remote system then returns the compiled code to the local execution environment. Exemplary embodiments can provide the benefits of performing JIT compilation for an executing source program in a distributed manner so as to substantially remove the compilation overhead from the overall program execution time, while still allowing for the significant performance improvements provided by JIT compilation. By splitting the operations performed during JIT compilation into components that run simultaneously on multiple computers communicating over a network, exemplary embodiments can thereby be implemented to alleviate the conflict between the objectives of fast compilation speed and fast execution performance in JIT compilation, as well as provide additional benefits it terms of scalability, performance, and serviceability.

Figure 3:
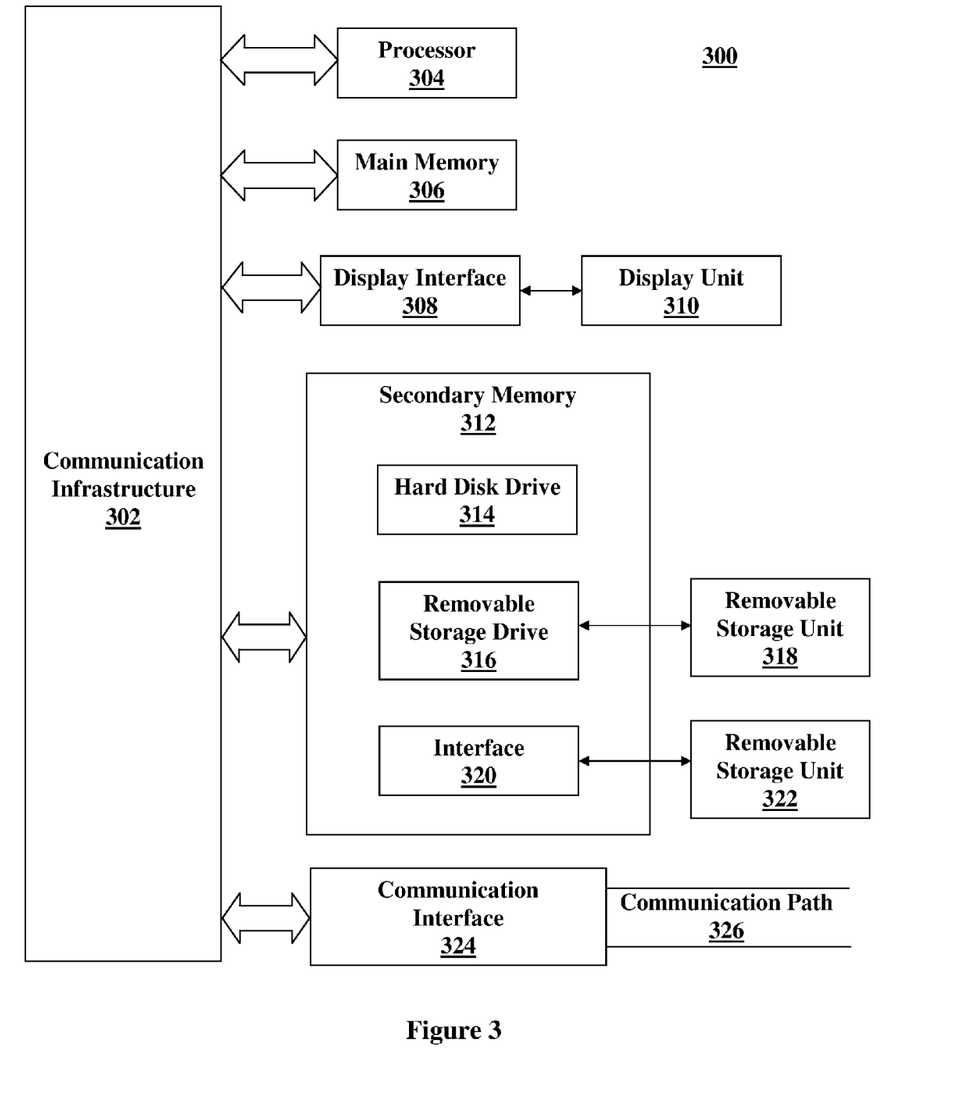
FIG. 3 is a block diagram illustrating an exemplary computer system that can be used for implementing exemplary embodiments of the present invention.

Exemplary embodiments of the present invention can implemented using one or more program modules and data storage units. As used herein, the term "modules", "program modules", "components", "systems", "tools", "utilities", and the like include routines, programs, objects, components, data structures, and instructions, or instructions sets, and so forth that perform particular tasks or implement particular abstract data types. As can be appreciated, the modules refer to computer-related entities that can be implemented as software, hardware, firmware and/or other suitable components that provide the described functionality, and which may be loaded into memory of a machine embodying an exemplary embodiment of the present invention. Aspects of the modules may be written in a variety of programming languages, such as C, C++, Java, etc. As used herein, the terms "repository", "data storage unit," "data store", "storage unit", and the like can refer to any suitable memory device that may be used for storing data, including manual files, machine readable files, and databases. The functionality provided by exemplary embodiments can be combined and/or further partitioned. The modules and/or storage units can all be implemented and run on the same computing system (for example, the exemplary computer system illustrated in FIG. 3 and described below) or they can be implemented and run on different computing systems. For example, one or modules can be implemented on a personal computer operated by a user while other modules can be implemented on a remote server and accessed via a network.

Figure 1:
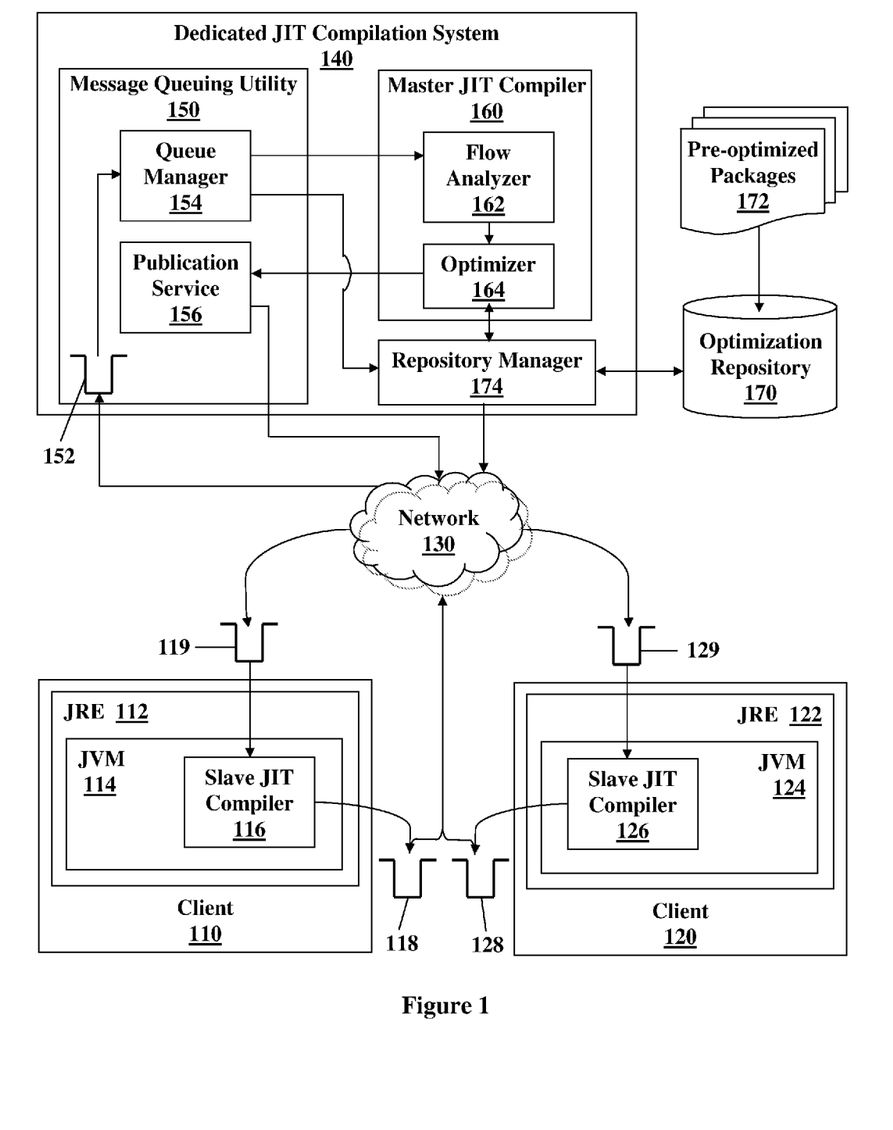
FIG. 1 is a block diagram illustrating an exemplary embodiment of a distributed computing system providing an environment for performing JIT compilation.

Referring now to FIG. 1, a block diagram illustrating an exemplary embodiment of a distributed JIT compilation system 100 in which multiple computing devices running simultaneously and communicating over one or more data networks are utilized is provided. Distributed JIT compilation system 100 is a client-server environment providing capabilities for real-time interaction and exchange of information between client and server machines. It should of course be noted that FIG. 1 is provided as an illustrative example of a distributed data processing system and computing devices within which exemplary embodiments may be implemented. Accordingly, FIG. 1 is exemplary only and not intended to state or imply any limitation with regard to the types and/or configurations of computing devices within which exemplary embodiments may be implemented. Many modifications to the computing devices and environment depicted in FIG. 1 may be made without departing from the spirit and scope of the present invention.

Exemplary system 100 includes a dedicated JIT compilation server 140 coupled to client computing devices 110, 120 over a computer communications network 130. JIT compilation server 140 and clients 110, 120 can each be implemented in the form of hardware and/or software. JIT compilation server 140 can be operatively connected to one or more host data store(s) that can be employed to store information local to the host. Similarly, clients 110, 120 can each be operatively connected to one or more client data store(s) that can be employed to store information local to the clients. Network 130 can facilitate communications between JIT compilation server 140 and clients 110, 120 by any suitable wired (including optical fiber) and/or wireless technology, including, but not limited to, local area networks (LANs), wireless networks, wide-area networks (WAN), the Internet (a network of heterogeneous networks using the Internet Protocol, IP), and virtual private networks.

According to the client-server model of computer process interaction utilized in exemplary embodiments disclosed herein, a client process sends a message including a request to a server process, and the server process responds by providing a service. The server process may also return a message with a response to the client process. Often the client process and server process execute on different computer devices, called hosts, and communicate via a network using one or more protocols for network communications. As used herein, the term "server" refers to the process that provides the service, or the host computer device on which the process operates. Similarly, as used herein, the term "client" refers to the process that makes the request, or the host computer device on which the process operates. In addition, a process executing as a server can be broken up to run as multiple servers on multiple hosts (sometimes called tiers) for reasons that include reliability, scalability, and redundancy, but not limited to those reasons.

In the present exemplary embodiment, clients 110, 120 each depend on runtime environments that employ "just-in-time" (JIT) compilation for programming code written in Java. These environments are implemented to dynamically compile program code that is loaded incrementally, possibly from a remote target. More specifically, each of clients 110, 120 depends on a respective Java Runtime Environment (JRE) 112, 122 that instantiates a respective Java Virtual Machine (JVM) instance 114, 124 for each source program being executed in the JRE. A JVM instance is a set of program modules that use a virtual machine model designed to implement the Java platform for executing Java programming language code for a particular native platform. Each JVM instance is architecture dependent and, in different exemplary embodiments, may be a piece of software that may be written in Java or another programming language other than Java, or may be implemented as a hardware CPU. A JVM instance utilizes a stack-based architecture, in which instruction operands are loaded to an internal stack before being used and does not interact with the source language directly. Rather, in such an environment, source programs written in the Java programming language are first converted into an intermediate, architecture-neutral distribution format, called Java bytecode, and the sequences of bytecodes are "virtual machine instructions" that describe the operations that each method in a Java class performs in a JVM. Java bytecode is normally, but not necessarily, generated from Java source code. A bytecode program can be executed before it is compiled to machine code using, for example, a stack-based bytecode interpreter that parses the instructions one at a time. When a client completes execution of a source program, the corresponding JVM instance for that program is garbage collected.

Each of JVM instances 114, 124 employs a respective slave JIT compiler 116, 126 that is configured to direct dynamic compilation of bytecode sequences of an input Java program by sending requests as necessary at runtime ("on the fly") to selectively compile the most frequently executing bytecodes to native code over network 130 to JIT compilation server 140. When a JVM instance is instantiated for execution of a source program in a JRE, the slave JIT compiler employed by the JVM instance registers with JIT compilation server 140 to allow for communication therebetween. As noted above, distributed JIT compilation system 100 as depicted in FIG. 1 is provided as one illustrative example of a distributed data processing system and computing devices within which exemplary embodiments may be implemented, and not intended to state or imply any limitation with regard to the types and/or configurations of computing devices within which exemplary embodiments may be implemented. In alternative exemplary embodiments, for instance, distributed JIT compilation system 100 may be configured to include any number of client systems each depending on a respective JRE instantiating a respective JVM instance for a source program executing on the client system that includes a respective slave JIT compiler registered with JIT compilation server 140 at any given moment.

The particular native code for each of JIT compilers 116, 126 is code that is intended to directly run on the same type of computer and operating system of the respective client platform upon which the JIT compiler itself is running. Each of slave JIT compilers 116, 126 operates on a Java bytecode thread in the respective JVM instance 114, 124 that is separate from the actual program threads so that the program can execute while compilation is occurring. A bytecode thread is similar to an application thread—execution is sequential, but multiple threads can execute in parallel, and each thread has its own program counter and execution stack. The execution stack stores information about each active subroutine of the running program, such as the return address, parameters, and local variables, in a respective stack frame for the subroutine.

In the present exemplary embodiment, each of JVM instances 114, 124 also includes, in addition to a respective slave JIT compiler, an interpreter so that it may support multiple execution modes in which only selected parts of a program are compiled, whereas the rest is interpreted. Such a strategy can be used, for example, to minimize total execution time because most execution time for a program is spent in only a small portion of the program's code. Interpreting, and not compiling, seldom-used code in this fashion can save time and space.

To provide for such a multiple execution mode environment, each of slave JIT compilers 116, 126 includes a sampling profiler that observes the executing program's behavior and conditions by periodically sampling the threads to find frequently executing methods. Each sampling profiler can also provide facilities for specialized profiling of method versions to collect information about how the program is behaving and to store dynamic values that might not change in a current execution of the program. Program execution can thus be initiated using the interpreter as the first execution mode, and the profiler can be utilized to identify those parts of an program's code that are most critical for performance at runtime. For example, because of standard object-oriented programming practices, there tend to be many relatively small methods that lead to more frequent method invocations such as a method solely for accessing a private field variable. Also, because an object constructor method is automatically created in Java even where it is not explicitly written in a program, there tend to be many empty object constructor methods. The profiler can be configured, for example, to associate a method invocation count with each method that is initialized to a certain threshold value. Whenever the interpreter executes the method, the profiler decrements the invocation count. When the count reaches zero, it is determined that the method has been invoked frequently enough, and JIT compilation is invoked for the method, as described in greater detail below, to achieve higher performance. If the method includes a loop, the slave JIT compiler can handle the method in a different manner. When the interpreter detects a loop backedge, it "snoops" the loop iteration count on the basis of a simple bytecode pattern-matching sequence, and then adjusts the amount by which the invocation count is decremented, depending on the iteration count.

Upon being invoked for a selected bytecode sequence, each of slave JIT compilers 116, 126, rather than performing the expensive compilation analysis and optimizations within respective JVM instances 114, 124, will construct and transmit a request message for the compilation to be performed over network 130 to JIT compilation server 140. The request message can include the bytecode sequence to be compiled as well as details about the selected bytecode sequence, the program's execution state (for example, the method parameters, the local variables, the current variable values, the registers, the operand stack, the program counter, etc., as provided in the top stack frame), the underlying hardware and software of the client platform on which the code is executing (for example, identification of the operating system and chipset employed by the client platform), and operational data regarding the method as collected by the sampling profiler implemented within the slave JIT compiler constructing and transmitting the request method. Upon constructing and sending a compilation request message to JIT compilation server 140, each of slave JIT compilers 116, 126 is configured to insert an entry containing information about the request in a respective hash table 118, 128 or other suitable indexing data structure to provide for a unique reference to the requested compilation.

As shown in FIG. 1, JIT compilation server 140 is implemented as a JIT compilation service provider that includes a message queuing middleware utility 150, a master JIT compiler 160, and a repository manager 174 that manages a pre-compiled code repository 170. Message queuing middleware utility 150 includes an asynchronous request message queue 152 that is monitored by a queue manager 154 and a publication service 156. Asynchronous request message queue 152 and queue manager 154 operate to facilitate inbound communication of compilation request messages transmitted from slave JIT compilers 116, 126 operating on clients 110, 120 to master JIT compiler 160. Message queuing middleware utility 150 can be implemented using a message queuing platform such as, for example, IBM WebSphere MQ, that enables intercommunication between slave JIT compilers 116, 126 and master JIT compiler 140 to be asynchronous. When a compilation request message transmitted from a slave JIT compiler operating over network 130 is received at JIT compilation server 140, the request message is added to request message queue 152. New request messages are placed at the end of request message queue 152, which holds each request message until master JIT compiler 160 is available to process it, and queue manager 154 retrieves request messages from the front of the request message queue. Queue manager 154 and request message queue 152 can thereby provide for a scalable and reliable messaging infrastructure that allows slave JIT compilers 116, 126 to send request messages asynchronously, without having or requiring knowledge of the availability of master JIT compiler. This can allow for JREs 112, 122 to continue processing the source programs, as well as allow for JIT compilation server 140 to perform batch processing of request messages.

Queue manager 154 monitors request message queue 152 and transmits triggering messages to notify master JIT compiler 160 when new compilation request messages are retrieved from the front of the request message queue. Master JIT compiler 160 can then receive compilation request messages from queue manager 154 and perform the compilation and optimization requested by the slave JIT compilers sending the request messages. As shown in FIG. 1, master JIT compiler 160 includes a flow analysis module 162 and an optimization module 164. When processing a request message, flow analysis module 162 can be configured to perform a linear-time traversal of the given bytecode sequence to generate the basic blocks and the loop structures. Flow analyzer 162 then converts the given bytecode sequence to an internal, intermediate language (IL) representation in which, for example, some new opcodes are introduced to represent operations that result from the optimizations. An IL representation is different from bytecode but still at a higher level than the target processor's native instructions. For example, the IBM JIT compiler uses a sequence of expression trees to represent the method's operations. The IL representation, which retains stack semantics in the manner of the original bytecode sequence, is generated as the internal representation to avoid the conversion cost in the compilation process. The IL provides an instruction form more suitable for code-improving transformations or optimizations as an intermediate step before generation of native code for execution by the targeted machine. Flow analyzer 162 can also be implemented to perform stack analysis on the IL representation, in which the variables in stack computation are separately mapped to each of the logical registers for integer and floating-point calculation by traversing bytecode stack operations.

During stack analysis, the region for register allocation of local variables is also defined, and the number of accesses of local variables in each region is counted.

After the flow analysis is performed on the bytecode sequence, the IL representation is then passed to optimizer 164, which is configured to perform a sequence of optimizations to improve quality and efficiency of the code. Optimizer 164 can apply several techniques to the internal IL representation of the bytecode sequence that may include, for example, method inlining, exception check elimination, common subexpression elimination, loop versioning, and dataflow analysis optimizations such as constant propagation and dead code elimination. After performing the optimization techniques, optimizer 164 is configured to generate native code based on the details of the underlying client that requested compilation of the particular bytecode sequence from the optimized sequences of IL code by allocating physical registers for each stack and local variable. The register allocation can be performed synchronously with the code generation. Optimizer 164 can then perform simple code scheduling on the generated native code to reorder the instructions so that they best fit the requirements of the underlying machine. Optimizer 164 can identify the relevant characteristics of the client upon which the source program containing the particular bytecode is executing and make use of this information in both code generation and code scheduling. The generated code can rely on the corresponding JRE to perform activities such as ensuring a type cast is legal or allocating certain types of objects that are impractical to perform directly in the code itself.

Upon performing the optimizations and generating the native code as described, optimizer 164 transmits the results of the bytecode sequence optimizations to a repository manager 174 and an indication of the optimizations to publication service 156. Publication service 156, which implemented within message queuing utility 150 along with queue manager 154 and request message queue 152, is configured to broadcast a notification message via network 130 to each of slave JIT compilers 116, 126 for each bytecode sequence optimized by master JIT compiler 160 providing a notification that the optimizations performed on the bytecode sequence are now available. As shown in FIG. 1, each slave JIT compiler contains a respective optimization subscriber queue 119, 129 for receiving optimization messages published by publication service 156. That is, once registered with JIT compilation server 140, each of slave JIT compilers 116, 126 can subscribe to all notification messages produced by publication service 156 through its respective subscriber queue, and thereby receive notification of the results of the optimizations performed for all bytecode sequences processed by master JIT compiler 160, and not just those optimizations requested by that slave JIT compiler. Through this event-driven publish/subscribe messaging model, publication service 156 can send notification messages to each and every subscribing slave JIT compiler without having or requiring knowledge of how many subscribing slave JIT compilers there are or knowledge of the details of the client platforms hosting the subscribing slave JIT compilers.

In exemplary embodiments, publication service 156 can be implemented to include the operational data containing in the compilation request messages as collected by the sampling profilers implemented within the slave JIT compilers in the notification messages. In this manner, each of slave JIT compilers 116, 126, rather than only relying on sampling data taken for the specific source program it is executing, will be able to utilize the operational data sampled for methods being invoked in multiple source programs that are concurrently executing.

Repository manager 174 manages a data store of bytecode sequence optimizations in an optimization repository 170. Upon receiving the results of each bytecode sequence optimization from optimizer 164, repository manager 174 is configured to store the results in optimization repository 170. In exemplary embodiments, optimization repository 170 can also be loaded with prepared packages 172 of pre-optimized machine code instructions for frequently occurring bytecode sequences. Optimization repository 170 can be loaded in this manner even where no source programs are presently being executed by JREs 112, 122 on clients 110, 120. Each of prepared packages 172 can include a set of bytecode sequence optimizations for code being executed on a particular platform, a particular product version, and a particular version of a particular operating system. Each of these sets of bytecode sequence optimizations can be provided by a single, unique identifier for subscription purposes. Each prepared package can come in the form of a ajar file (short for Java archive) that contains multiple class files that can include, for example, optimized code for general class libraries, existing programming frameworks designed for general use in newly developed programs, and other reusable code objects. Furthermore, whenever a new prepared package of bytecode sequence optimizations is loaded into optimization repository 170, repository manager 174 can be configured to trigger publication service 156 to publish a series of notifications of the prepared bytecode sequence optimizations to subscriber queues 119, 129 so that interested slave JIT compilers can take advantage of the optimizations.

In exemplary embodiments, publication service 156 can be configured to tag each notification message with keywords or topics that represent an indication of a subject describing the particular optimization results being broadcast as available. The keywords or topics can be organized into hierarchies to enable more complex classification. This can allow for each slave JIT compiler to define the notification messages which it will receive by logging a subscription for notification messages tagged or otherwise associated with certain keywords or topics with publication service 156 when it registers with JIT compilation server 140. This can enable publication service 156 to publish notification messages to all subscribing slave JIT compilers on a particular topic without having knowledge of the specific implementation details for each the subscribers. Thus, a slave JIT compiler will receive a notification message for each bytecode sequence optimization requested in a request message sent by that slave JIT compiler, as well as each notification message for a bytecode sequence optimization tagged or otherwise associated with keywords or topics specified in the subscription logged for the slave JIT compiler.

The published notification messages that match the subscription logged for a particular slave JIT compiler are received by and added to the end of the subscriber queue for that slave JIT compiler. Each slave JIT compiler is configured to process each notification message from the front of its subscriber queue. Upon encountering a notification message for a bytecode sequence optimization performed by master JIT compiler 160 that it is interested in utilizing, each slave JIT compiler is configured to construct and send a retrieval request message via network 130 to JIT compilation server 140 for the particular bytecode sequence optimization that corresponds to the notification message. When a retrieval request message transmitted from a slave JIT compiler is received at JIT compilation server 140, the request message is added to request message queue 152. Queue manager 154 is configured to transmit triggering messages to notify repository manager 174 upon retrieving new retrieval request messages from request message queue 152. Repository manager 174 can then receive the retrieval request messages from queue manager 154, retrieve the particular bytecode sequence optimizations requested from optimization repository 170, and send the requested optimizations to the corresponding requesting slave JIT compilers via network 130.

In the present exemplary embodiment, each bytecode sequence optimization sent by repository manager 160 is received by and added to the subscriber queue of the particular slave JIT compiler that requested the optimization. In exemplary embodiments, each subscriber queue can be implemented to prioritize optimizations received by repository manager 160 over notification messages received by publication server 156 so that each slave JIT compiler can receive requested optimizations ahead of notification messages. The slave JIT compiler can then retain the optimized native code sequence in a cache data store managed within the corresponding JVM instance for use during execution of the source program (as well as re-use for bytecode sequences that are re-executed during execution of the source program). Because each slave JIT compiler can receive notification messages for each of the bytecode sequence optimizations performed by master JIT compiler 160 and otherwise made available by JIT compilation server 140 (for example, through series broadcasts of notification messages by publication service 156 for prepared packages of bytecode sequence optimizations loaded into optimization repository 170), and not just those optimizations requested by that slave JIT compiler, each slave JIT compiler can be configured to continually populate the data store managed within the corresponding JVM instance with applicable optimizations for bytecode sequences in advance of execution.

In exemplary embodiments, each of JVM instances 114, 124 can be further configured to utilize a Java class loader module implemented within the corresponding JRE to obtain pre-optimized code from JIT compilation server 140 for bytecode sequences within the source program prior to attempting to execute the code. A source Java program can consist of many class files of bytecode sequences. A Java class loader is a generally part of a JRE that dynamically loads Java classes into the JVM instance. For example, the Java class loader is typically responsible for locating libraries of object code, reading their contents, and loading the classes contained within the libraries. For each class file to be loaded in a JVM instance, the JVM instance can be implemented to direct slave JIT compiler to construct and send retrieval request messages to JIT compilation server 140 for pre-optimized native code corresponding to the class file maintained in optimization repository 170. When the request message for a class file is received from queue manager 154 by repository manager 174, the repository manager can query optimization repository 170 for corresponding pre-optimized native code. If such optimized code is found in optimization repository 170, repository manager 174 can retrieve the requested optimization from the optimization repository and send the optimization to the requesting slave JIT compiler. If such optimized code is found in optimization repository 170, repository manager 174 can send a notification of such to the requesting slave JIT compiler.

Figure 2A:
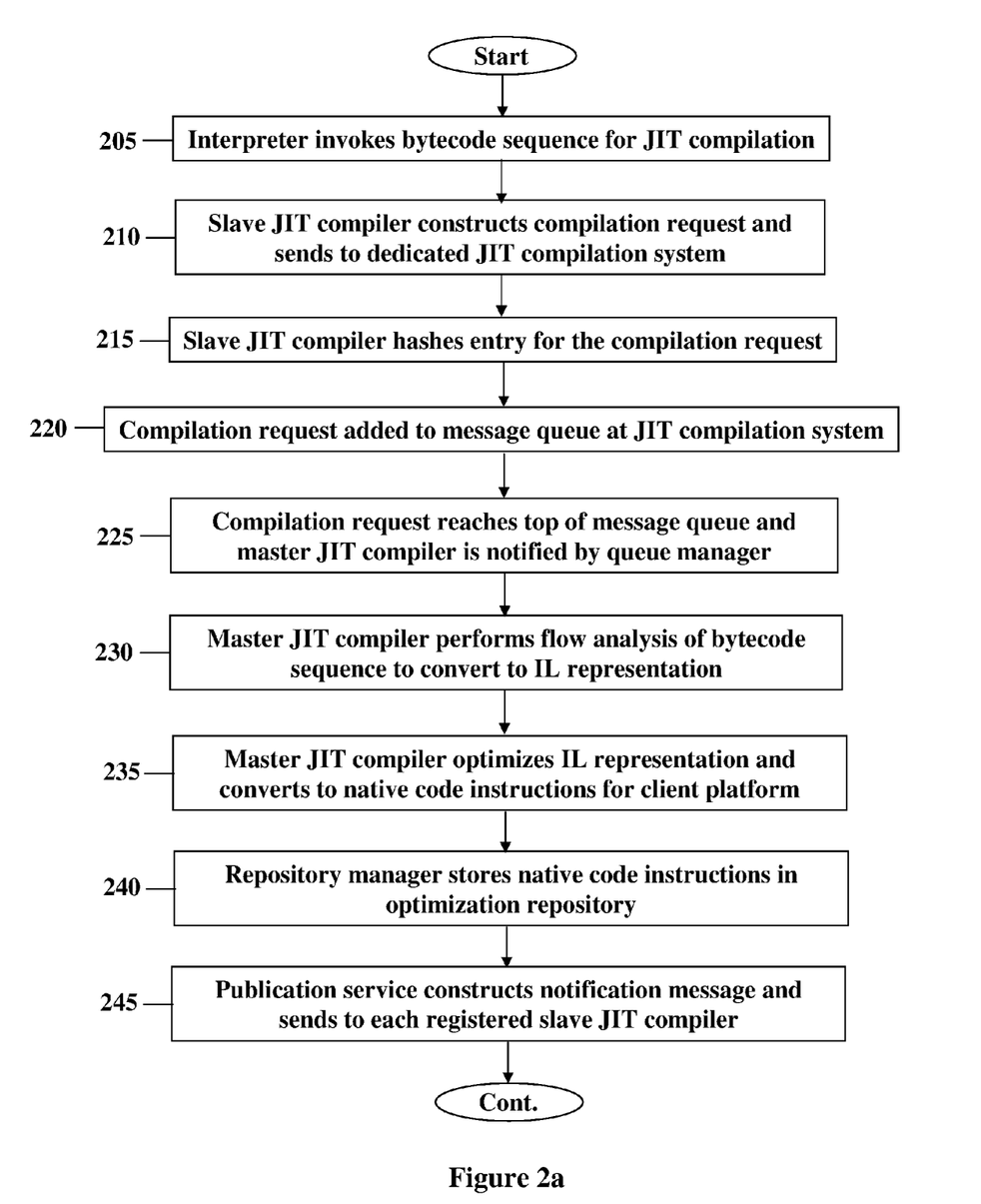
FIGS. 2a-2b are flow diagrams illustrating an exemplary embodiment of a process for performing JIT compilation of a bytecode sequence from a source program being executed by a JVM instance instantiated by a JRE on a client platform remotely from the client platform.
Figure 2B:
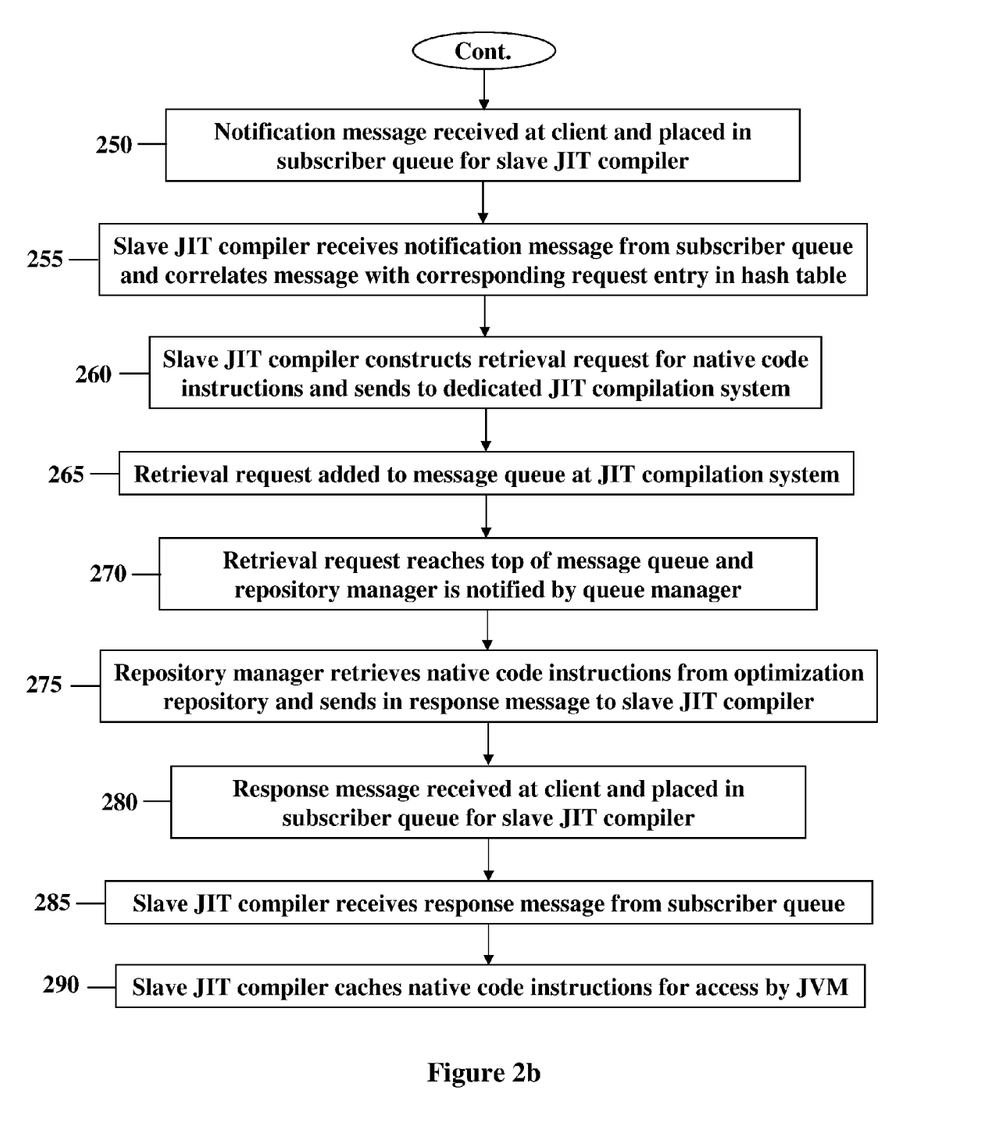

Referring now to FIGS. 2a and 2b, a flow chart illustrating an exemplary embodiment of a process 200 for performing JIT compilation of a bytecode sequence from a source program being executed by a JVM instance instantiated by a JRE on a client platform remotely from the client platform is provided. In exemplary process 200, at block 205, an interpreter implemented within the JVM instance invokes the bytecode sequence for JIT compilation. At block 210, a slave JIT compiler implemented within the JVM instance constructs a compilation request message for the invoked bytecode sequence and sends the request message via a network to a dedicated JIT compilation system with which the slave JIT compiler is registered. The compilation request message can include can include the invoked bytecode sequence as well as details about the bytecode sequence, the source program's execution state, the underlying hardware and software of the client platform on which the code is executing (for example, identification of the operating system and chipset employed by the client platform), and operational data regarding the bytecode sequence as collected by a sampling profiler implemented within the slave JIT compiler. At block 215, the slave JIT compiler inserts an entry containing information about the request in a respective hash table or other suitable indexing data structure to provide for a unique reference to the requested compilation.

At block 220 of exemplary process 200, the compilation request message is received at the dedicated JIT compilation system and placed at the end of an asynchronous request message queue. At block 225, a queue manager notifies a master JIT compiler implemented within the dedicated compilation system upon the compilation request message reaching the top of the request message queue. At block 230, the master JIT compiler performs flow analysis of the bytecode sequence to convert the bytecode sequence to an intermediate language (IL) representation. At block 235 the master JIT compiler performs code optimization operations on the IL representation and converts the IL representation to a set of instructions written machine code that is native to the client platform. At block 240, a repository manager implemented within the dedicated compilation system stores the set of machine code instructions in an optimization repository. At block 245, a publication service implemented within the dedicated compilation system constructs a notification message indicating the availability of the set of machine code instructions and publishes the notification message via the network to each slave JIT compiler that is registered with the dedicated JIT compilation system, including the slave JIT compiler that sent the compilation request message.

At block 250 of exemplary process 200, the notification message is received at the client platform and placed in an optimization subscriber queue implemented by the slave JIT compiler. At block 255, the slave JIT compiler receives the notification message from the subscriber queue and correlates the notification message with the request information entry inserted in the hash table at block 215. At block 260, the slave JIT compiler constructs a retrieval request message requesting the set of machine code instructions and sends the retrieval request message via the network to the dedicated JIT compilation system. At block 265, the retrieval request message is received at the dedicated JIT compilation system and placed at the end of the asynchronous request message queue. At block 270, the queue manager notifies the repository manager upon the retrieval request message reaching the top of the request message queue. At block 275, the repository manager retrieves the set of machine code instructions from the optimization repository and sends the set of machine code instructions in a response message to the client platform via the network.

At block 280 of exemplary process 200, the response message is received at the client platform and placed in the optimization subscriber queue implemented by the slave JIT compiler. At block 285, the slave JIT compiler receives the response message from the subscriber queue. At block 290, the slave JIT compiler caches the set of machine instructions for access by the JVM during execution of the source program.

In the preceding description, for purposes of explanation, numerous specific details are set forth in order to provide a thorough understanding of the described exemplary embodiments. Nevertheless, one skilled in the art will appreciate that many other embodiments may be practiced without these specific details and structural, logical, and electrical changes may be made.

Some portions of the exemplary embodiments described above are presented in terms of algorithms and symbolic representations of operations on data bits within a processor-based system. The operations are those requiring physical manipulations of physical quantities. These quantities may take the form of electrical, magnetic, optical, or other physical signals capable of being stored, transferred, combined, compared, and otherwise manipulated, and are referred to, principally for reasons of common usage, as bits, values, elements, symbols, characters, terms, numbers, or the like. Nevertheless, it should be noted that all of these and similar terms are to be associated with the appropriate physical quantities and are merely convenient labels applied to these quantities. Unless specifically stated otherwise as apparent from the description, terms such as "executing" or "processing" or "computing" or "calculating" or "determining" or the like, may refer to the action and processes of a processor-based system, or similar electronic computing device, that manipulates and transforms data represented as physical quantities within the processor-based system's storage into other data similarly represented or other such information storage, transmission or display devices.

Exemplary embodiments of the present invention can be realized in hardware, software, or a combination of hardware and software. Exemplary embodiments can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

Exemplary embodiments of the present invention can also be embedded in a computer program product, which comprises all the features enabling the implementation of the methods described herein, and which—when loaded in a computer system—is able to carry out these methods. Computer program means or computer program as used in the present invention indicates any expression, in any language, code or notation, of a set of instructions intended to cause a system having an information processing capability to perform a particular function either directly or after either or both of the following (a) conversion to another language, code or, notation; and (b) reproduction in a different material form.

A computer system in which exemplary embodiments can be implemented may include, inter alia, one or more computers and at least a computer program product on a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface including a wired network or a wireless network that allow a computer system to read such computer readable information.

FIG. 6 is a block diagram of an exemplary computer system 600 that can be used for implementing exemplary embodiments of the present invention. Computer system 600 includes one or more processors, such as processor 604. Processor 604 is connected to a communication infrastructure 602 (for example, a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

Exemplary computer system 600 can include a display interface 608 that forwards graphics, text, and other data from the communication infrastructure 602 (or from a frame buffer not shown) for display on a display unit 610. Computer system 600 also includes a main memory 606, which can be random access memory (RAM), and may also include a secondary memory 612. Secondary memory 612 may include, for example, a hard disk drive 614 and/or a removable storage drive 616, representing a floppy disk drive, a magnetic tape drive, an optical disk drive, etc. Removable storage drive 616 reads from and/or writes to a removable storage unit 618 in a manner well known to those having ordinary skill in the art. Removable storage unit 618, represents, for example, a floppy disk, magnetic tape, optical disk, etc. which is read by and written to by removable storage drive 616. As will be appreciated, removable storage unit 618 includes a computer usable storage medium having stored therein computer software and/or data.

In exemplary embodiments, secondary memory 612 may include other similar means for allowing computer programs or other instructions to be loaded into the computer system. Such means may include, for example, a removable storage unit 622 and an interface 620. Examples of such may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a communications interface 624. Communications interface 624 allows software and data to be transferred between the computer system and external devices. Examples of communications interface 624 may include a modem, a network interface (such as an Ethernet card), a communications port, a PCMCIA slot and card, etc. Software and data transferred via communications interface 624 are in the form of signals which may be, for example, electronic, electromagnetic, optical, or other signals capable of being received by communications interface 624. These signals are provided to communications interface 624 via a communications path (that is, channel) 626. Channel 626 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 606 and secondary memory 612, removable storage drive 616, a hard disk installed in hard disk drive 614, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It can be used, for example, to transport information, such as data and computer instructions, between computer systems. Furthermore, the computer readable medium may comprise computer readable information in a transitory state medium such as a network link and/or a network interface including a wired network or a wireless network that allow a computer to read such computer readable information.

Computer programs (also called computer control logic) are stored in main memory 606 and/or secondary memory 612. Computer programs may also be received via communications interface 624. Such computer programs, when executed, can enable the computer system to perform the features of exemplary embodiments of the present invention as discussed herein. In particular, the computer programs, when executed, enable processor 604 to perform the features of computer system 600. Accordingly, such computer programs represent controllers of the computer system.

Although exemplary embodiments of the present invention have been described in detail, the disclosure is not intended to be exhaustive or limited to the described embodiments. It should be understood that various changes, substitutions and alterations could be made thereto without departing from spirit and scope of the inventions as defined by the appended claims. Variations described for exemplary embodiments of the present invention can be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to exemplary embodiments of the present invention.

The exemplary embodiments presented herein were chosen and described to best explain the principles of the various embodiments of the present invention and the practical application, and to enable others of ordinary skill in the art to understand the invention. It will be understood that those skilled in the art, both now and in the future, may make various modifications to the exemplary embodiments described herein without departing from the spirit and the scope of the present invention as set forth in the following claims. These following claims should be construed to maintain the proper protection for the various embodiments of the present invention.

The invention claimed is:

1. A method of performing distributed just-in-time compilation, the method comprising:
sending a first request message from a client platform to a dedicated compilation server via a network, the first request message requesting just-in-time compilation of a first bytecode sequence generated from a set of code for a source program executing on the client platform, the first request message including the first bytecode sequence and a first set of information describing the client platform, wherein the first request message is sent from a first slave just-in-time compiler running on the client platform, and the first slave just-in-time compiler is one of a plurality of slave just-in-time compilers registered with the dedicated compilation server;

hashing a first entry for the first request message in a hash table managed by the first slave just-in-time compiler upon sending the first request message from the client platform to the dedicated compilation server;

receiving the first request message within an asynchronous request message queue implemented within the dedicated compilation server;

compiling the first bytecode sequence at the dedicated compilation server into a first set of machine code instructions executable by the client platform, wherein compiling the first bytecode sequence at the dedicated compilation server comprises triggering a master just-in-time compiler to process the first request message by performing a set of flow analysis and optimization operations on the first bytecode sequence to generate the first set of machine code instructions upon the first request message being retrieved from the front of the asynchronous request message queue by a queue manager implemented within the dedicated compilation server;

storing the first set of machine code instructions in a repository managed by the dedicated compilation server;

sending a first notification message indicating that the first set of machine code instructions are available from the dedicated compilation server to the client platform via the network, wherein sending the first notification message comprises publishing the first notification message to a respective subscriber queue managed by each of the slave just-in-time compilers registered with the dedicated compilation server;

receiving the first notification message within the respective subscriber queue managed by the first slave just-in-time compiler;

correlating the first set of machine code instructions with the first entry in the hash table upon the first notification message being retrieved from the front of the respective subscriber queue managed by the first slave just-in-time compiler;

sending a second request message from the client platform to the dedicated compilation server via the network requesting the first set of machine code instructions;

accessing the repository to send the first set of machine code instructions from the dedicated compilation server to the client platform; and storing the first set of machine code instructions in a cache data store managed by the slave just-in-time compiler.

2. The method of claim 1, wherein the set of code for the source program is Java code, wherein the first bytecode sequence comprises Java bytecode instructions, wherein the first slave just-in-time compiler is incorporated within a Java Virtual Machine instance instantiated by a Java Runtime Environment for the source program executing on the client platform, and wherein the first bytecode sequence is one of a plurality of bytecode sequences generated from the set of code for the source program during execution of the source program on the client platform by the Java Runtime Environment.

3. The method of claim 2, further comprising storing a plurality of machine code instruction sets executable by the client platform in the repository that includes a second set of machine code instructions comprising compiled machine code instructions for a second bytecode sequence generated from the set of code for the source program by the Java Runtime Environment, sending a respective notification message for each of the machine code instruction sets of the plurality of machine code instruction sets via the network from the dedicated compilation server to the respective subscriber queue managed by each of the slave just-in-time compilers registered with the dedicated compilation server, sending a third request message from the client platform to the dedicated compilation server via the network requesting the second set of machine code instructions, sending the second set of machine code instructions from the dedicated compilation server to the client platform, and storing the second set of machine code instructions in the cache data store managed by the slave just-in-time compiler.

4. The method of claim 2, wherein the Java Virtual Machine instance further incorporates an interpreter and a sampling profiler, wherein the sampling profiler is configured to observe a set of state information for the source program executing on the client platform, and wherein the Java Virtual Machine instance is configured to selectively invoke either interpretation by the interpreter or just-in-time compilation for each bytecode sequence generated from the set of code for the source program during execution of the source program on the client platform by the Java Runtime Environment based upon the set of state information for the source program observed by the sampling profiler, wherein the first request message further includes the set of state information for the source program observed by the sampling profiler, and wherein the first notification message includes the set of state information included in the first request message.

* * * * *